Oct. 31, 1933.  E. F. ROSSMAN  1,933,151
SHOCK ABSORBER
Filed March 12, 1932
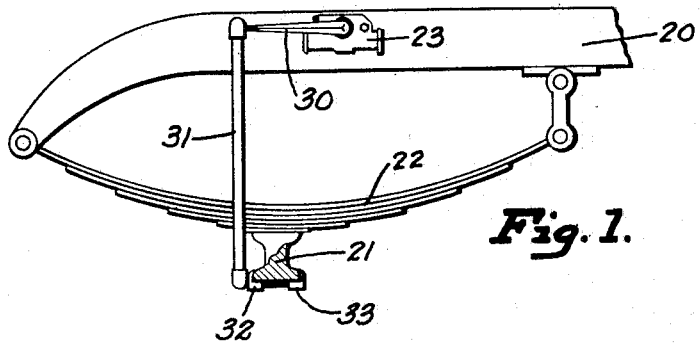
Fig. 1.
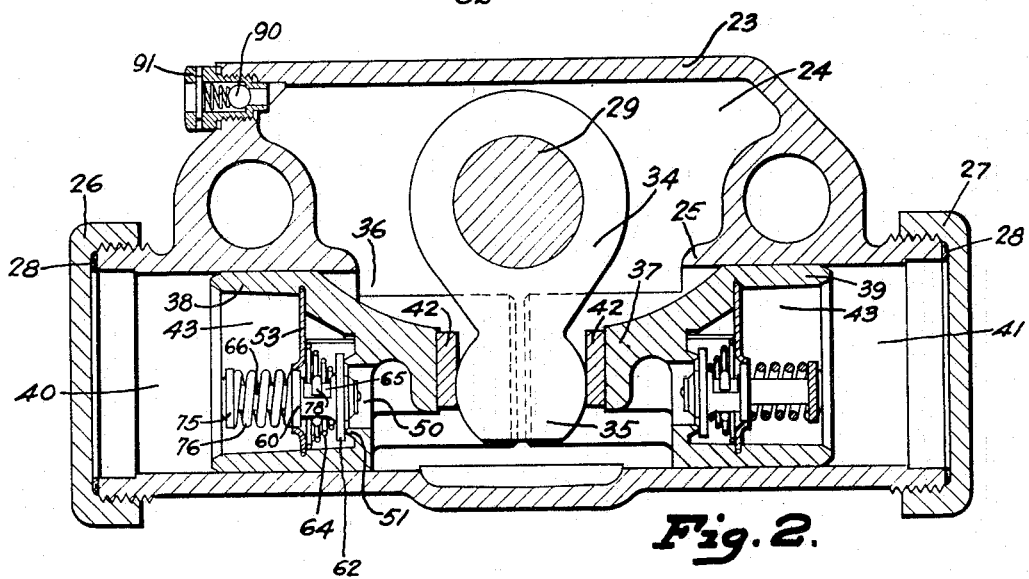
Fig. 2.
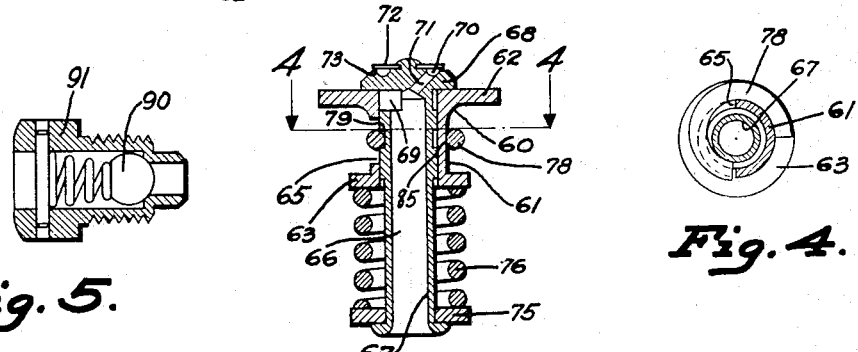
Fig. 5.
Fig. 3.
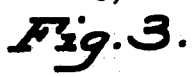
Fig. 4.
Inventor
EDWIN F. ROSSMAN
By Spencer, Hardman & John
Attorneys Patented Oct. 31, 1933

1,933,151

UNITED STATES PATENT OFFICE 1,933,151

SHOCK ABSORBER

Edwin F. Rossman, Dayton, Ohio, assignor to Delco Products Corporation, Dayton, Ohio, a corporation of Delaware Application March 12, 1932. Serial No. 598,365

8 Claims. (Cl. 188—88)

This invention relates to improvements in hydraulic shock absorber.

It is among the objects of the present invention to provide a hydraulic shock absorber with fluid flow control devices which will operate comparatively noiselessly.

Another object of the present invention is to increase the friction of certain fluid flow control devices of the shock absorber to prevent chattering thereof during operation.

Further objects and advantages of the present invention will be apparent from the following description, reference being had to the accompanying drawing wherein a preferred embodiment of one form of the present invention is clearly shown.

In the drawing:

Fig. 1 is a diagrammatic view of a vehicle chassis, a shock absorber equipped with the present invention being shown applied thereto.

Fig. 2 is a longitudinal sectional view of a shock absorber equipped with the present invention.

Fig. 3 is an enlarged sectional view of a fluid flow control device.

Fig. 4 is a transverse sectional view taken substantially along the line 4—4 of Fig. 3.

Fig. 5 is a detailed sectional view of one portion of the shock absorber.

Referring to the drawing, the numeral 20 designates the frame of the vehicle which is supported upon the axle 21 by springs 22. For sake of clearness the vehicle wheels, which are attached to the axle 21, have been omitted from the drawing.

The shock absorber comprises a housing or casing 23 providing a fluid reservoir 24 and a cylinder 25. The present drawing show the two open ends of the cylinder closed by cylinder head caps 26 and 27 respectively, each head cap being provided with a suitable gasket 28 to prevent fluid leaks.

In the casing there is journalled a rocker shaft 29, one end of which extends outside of the casing 23 and has the shock absorber operating arm 30 secured thereto. The free end of this arm is swivelly secured to one end of a link 31, the opposite end of said link being swivelly attached to a bracket 32 which is secured to the axle 21 by the clamping member 33. Inside the casing the rocker shaft 29 has the rocker lever 34 secured thereto, the free end 35 of said lever extending through the opening 36 in the casing into the cylinder 25 as shown in Fig. 2. This rocker arm or lever is the actuator for the piston 37 which is reciprocably supported within the cylinder 25. The piston 37 comprises two piston head portions 38 and 39, the former forming the vehicle spring compression control chamber 40, the latter the vehicle spring rebound control chamber 41 at opposite ends of the cylinder. Each piston head portion has a wearpiece 42 attached thereto which is engaged by the actuating arm 35 as shown in Fig. 2. Inasmuch as both piston heads are constructed substantially alike, only one will be described detailedly for the sake of brevity.

Referring to the piston head 38 and particularly to Fig. 2, a passage 50 provides a port through which fluid is adapted to flow into and from the compression chamber 40, dependent upon the movement of the piston. The piston head portions 38 and 39 are recessed providing a hollow 43 in each end of the piston. The inner wall has an annular ridge 51 provided about the port 50 forming a valve seat. Within the hollow end of the piston head portion is secured an abutment member or spider 53, said abutment member or spider having a central opening substantially in coaxial alignment with the port 50.

A fluid flow control device is provided in the piston head portion for controlling the flow of fluid through the port 50, this device being arranged to establish a substantially free flow of fluid from the reservoir 24 through the port 50 into the chamber 40 in response to movement of the piston toward the right as regards Fig. 2, and another portion of the fluid flow control device is adapted to establish a restricted flow of fluid from the spring compression control chamber 40 through the port 50 into the reservoir in response to the movement of the piston toward the left as regards Fig. 2.

Referring particularly to Figs. 2 and 3, it may be seen that the fluid flow control device comprises an intake valve 60 having a tubular body portion 61, each end of which having outwardly extending flanges designated by the numerals 62 and 63 respectively. The flange 62 being the larger one, forms the intake valve head and is adapted normally yieldably to engage the valve seat 51 in the piston head portion due to the effect of spring 64 which is interposed between the flange 62 and the abutment member 53 on the piston. Tubular portion 61 of the valve has an opening 65 in its side for purposes to be described.

The pressure release valve designated by the numeral 66, which valve is adapted to establish restricted flows of fluid from the chamber 39 through the port 50 in response to movements of the piston head portion 38 toward the left as regards Fig. 2, comprises a tubular body portion 67, having a head 68 which is of larger diameter than the body portion 67 and which closes one end of the tubular body portion 67 as shown in Fig. 3. This pressure release valve 66 is slidably carried or supported within the tubular portion 61 of the intake valve, the tubular body portion 67 of the valve 66 fitting slidably within said tubular portion 61 of the intake valve. The head portion 68 of the pressure release valve 66 is adapted normally to rest upon the flanged end 62 of the intake valve 60. An opening 69 in the side of the tubular body portion 67 adjacent the head 68 of valve 66 is normally confined within the tubular portion 61 of the intake valve 60 as shown in Fig. 3. In the outer end surface of the head 68 there is provided an annular groove 70 in communication with the inner portion of the tubular part 67 of the valve 66 through a channel 71. A disc 72 is secured to the head 68 in any suitable manner extending over the annular groove 70, thereby providing an annular orifice between said disc and the annular ridge 73 formed by the groove 70.

An abutment collar 75 is secured to the tubular portion 67 of valve 66 adjacent the open end thereof, this collar 75 providing an abutment for the spring 76 which surrounds the tubular portion 67 and also engages the flange 63 of the intake valve 60, thereby yieldably urging the valve 66 coaxially longitudinally of the tubular portion 61 of valve 60 whereby the head 68 of valve 66 will be urged yieldably to engage the flanged end 62 of the valve 60.

A resilient annulus or ring 78 fits about the tubular portion 61 of the intake valve 60, said resilient ring entering the opening 65 in said tubular portion 61 and engaging an annular groove 79 in the tubular portion 67 of the pressure release valve 66 which portion of the release valve is exposed by the opening 65 in the tubular portion 61 of the intake valve 60. This spring annulus 78 is constantly urging the tubular portion 67 of the valve 66 toward the side of the tubular portion 61 of the valve 60 opposite the opening 65 therein, thus chattering of the valve 66 when operated by pressure is substantially eliminated.

The fluid flow control device described, acts in the following manner:

When the piston 37 is moved toward the right as regards Fig. 2, in response to rebounding movement of the spring 22, away from the frame 20, fluid pressure acting through port 50 against the intake valve flange 62 will move said valve, against the effect of its spring 64, away from the valve seat 51 to establish a fluid flow between the valve seat 51 and valve flange 62 to introduce fluid into the chamber 40. In this instance it may be seen that the pressure release valve 66 will be moved bodily with the intake valve 60 forming a part of this valve in this instance. Upon the reverse movement of the piston, or in a direction toward the cylinder head cap 26 in response to compression movement of the spring 22 toward the frame 20, the valve flange 62 will be urged upon its seat and pressure will be exerted upon the fluid within chamber 40. The first flow to be established will be through the tubular portion 67 of the pressure release valve 66 through the channel 71 into the annular groove 70, thence from said annular groove through the annular orifice presented between the annular ridge 73 and the disc 72 in head 68 of the pressure release valve 66. If the fluid pressure within chamber 39 cannot properly be relieved by the fluid flow through channel 71 and groove 70, then the valve 66 will be moved bodily, relatively to the valve 60, against the effect of spring 76, thus uncovering the side opening 69 and establishing a restricted flow from the tubular portion 67 of valve 66 through said side opening into and through port 50. It will be seen that as the valve 66 slides relatively to the tubular portion 61 of the intake valve 60 the resilient annulus 78 will roll approximately about the point 85, the portion of said annulus within opening 65 in the tubular portion 61 moving out of the alignment of the portion adjacent point 85 and thus stretching the spring annulus 78. From this it may be seen that the tubular portion 67 of the pressure release valve will be urged toward the side of the tubular portion 61 of the intake valve opposite the side opening 65 increasingly as the valve 66 is moved to establish its flow, and thus chattering of the valve, which results from the movement of the valve from one side to the other in its support 61, will be substantially eliminated inasmuch as the valve is yieldably urged against one side of its support and substantially prevented from moving against the opposite side.

The provision of the spring annulus 78 is particularly advantageous where comparatively light springs 76 are used, or more specifically in cases where a light pressure release valve is desirable, for it has been found by experience that chattering increases with decreasing resistance to valve movements.

In the present shock absorber applicant has also provided a spring pressed valve 90 contained within a nipple 91 which is screwed into the casing of the shock absorber, preferably above the fluid level, said nipple opening to atmosphere. The valve 90 is so constructed and arranged that any pressures within the reservoir may be discharged through the nipple 91, the valve therein however, preventing any influx of air into the reservoir.

In the present invention applicant has provided a fluid flow control device for a shock absorber which will operate comparatively quietly due to the effect of spring annulus 78 urging the movable valve toward one side of its supporting member, thereby to prevent chattering.

While the form of embodiment of the present invention as herein disclosed, constitutes a preferred form, it is to be understood that other forms might be adopted, all coming within the scope of the claims which follow.

What is claimed is as follows:

1. In combination with a shock absorber having two relatively movable members which form a fluid chamber, and a port in one of said members providing for the flow of fluid into and out of said chambers; of a fluid flow control device for said port comprising a valve; a support for said valve; means engaging the valve and yieldably urging it longitudinally of the support to close the port; and means engaging the valve and urging it transversely of the support in one direction only.

2. In combination with a shock absorber having two relatively movable members which form a fluid chamber, and a port in one of said members providing for a flow of fluid into and out of said chambers; of a fluid flow control device for said port comprising, a valve; a tubular member slidably supporting the valve and providing a valve seat for the port; resilient means engaging the valve and urging it longitudinally of the tubular member to engage the valve seat and close the port; and resilient means engaging the valve and tubular member and urging the former transversely of the latter in one direction only.

3. In combination with a shock absorber having two relatively movable members which form a fluid chamber, and a port in one of said members providing for the flow of fluid into and out of said chambers; of a fluid flow control device for said port comprising, a tubular member having a head portion providing a valve seat for the port; a valve slidably supported within the tubular member and provided with a head portion adapted to engage the valve seat; a spring interposed between the valve and tubular member yieldably urging the head portion of the valve upon the valve seat portion of the tubular member; and a resilient annulus about the tubular member and engaging the valve urging said valve transversely of the tubular member in one direction only.

4. In combination with a shock absorber having two relatively movable members which form a fluid chamber, and a port in one of said members providing for the flow of fluid into and out of said chambers; of a fluid flow control device for said port, comprising a disc valve yieldably urged to close the port and having a central aperture and a tubular extension; a plunger valve slidably carried in the tubular extension of the disc valve and having a head portion adapted to seat upon said disc valve to close its aperture; a spring interposed between the disc and plunger valves yieldably urging the plunger valve longitudinally of the disc valve so that its head engages said disc valve; and a resilient annulus about the tubular portion of the disc valve and engaging the plunger valve yieldably to urge it transversely of the tubular portion of the disc valve in one direction only.

5. In combination with a shock absorber having two relatively movable members which form a fluid chamber, and a port in one of said members providing for the flow of fluid into and out of said chambers; of a fluid flow control device for said port comprising, a tubular member providing a valve seat, said tubular member having an opening in its side; a plunger valve slidably carried in said tubular member, having a head portion adapted to engage the valve seat; a spring yieldably urging the plunger valve so that its head portion engages the valve seat; and a spring annulus about the tubular member, extending into the side opening therof so as to engage the portion of the plunger valve exposed by said opening for urging the eplunger valve transversely of the tubular member in one direction only.

6. In combination with a shock absorber having two relatively movable members which form a fluid chamber, and a port in one of said members providing for the flow of fluid into and out of said chambers, and having an annular ridge about the port providing a valve seat; of a fluid flow control device for said port comprising, a disc valve yieldably urged upon said annular ridge, said disc valve having a central aperture and a tubular extension; a plunger valve slidably supported within the disc valve, said plunger valve having a head portion adapted to engage the disc valve to close its aperture; a coil spring about the plunger valve interposed between the tubular portion of the disc valve and said plunger valve and yieldably urging the plunger valve so that its head portion engages the disc valve; a spring annulus about the tubular portion of the disc valve and engaging one side of the plunger valve yieldably to urge it transversely thereof in one direction only.

7. In combination with a shock absorber having two relatively movable members which form a fluid chamber, and a port in one of said members providing for the flow of fluid into and out of said chambers, an annular ridge about said port providing a valve seat; of a fluid flow control device adapted to establish flows of fluid through said port in opposite directions, said device comprising a valve adapted to establish a substantially free flow of fluid through the port into the fluid chamber, said valve having a tubular body portion provided with an outwardly extending flange yieldably urged into engagement with the annular ridge, and also having an opening in one side thereof; a plunger valve slidably supported by the tubular portion of said first mentioned valve yieldably urged to close said tubular portion of said valve, but adapted in response to fluid pressure to establish a flow of of fluid from the fluid chamber through said valve; and a spring annulus about the tubular portion of said first mentioned valve extending into the side opening thereof and engaging the plunger valve portion exposed thereby to urge said plunger valve transversely of the first mentioned valve in one direction only.

8. In combination with a shock absorber having two relatively movable members which form a fluid chamber, and a port in one of said members providing for the flow of fluid into and out of said chambers of a fluid flow control device for said port adapted to establish fluid flows through said port in opposite directions in response to movements of the relatively movable members, said device comprising, an intake valve having a tubular body portion provided with a side opening and a flange head, said valve being urged yieldably to close the port; a pressure release valve slidably supported in the tubular portion of the intake valve, normally closing it, said pressure release valve being adapted to be moved by pressure axially of the tubular intake valve to establish a flow of fluid through the port oppositely to the flow established by the intake valve; and means engaging the tubular body portion of the intake valve and the portion of the pressure release valve exposed by the side opening in said tubular body portion of the intake valve, said means urging the pressure release valve toward one side of the tubular body portion of the intake valve.

EDWIN F. ROSSMAN.